United States Patent [19]

Shirosaki et al.

[11] 4,415,457

[45] Nov. 15, 1983

[54] PROCESS FOR TREATING LIQUID WASTE CONTAINING SOLID FINE PARTICLES

[75] Inventors: Kiyotaka Shirosaki; Yoshikazu Sugimoto, both of Hitachi; Masaki Takeshima, Komae, both of Japan

[73] Assignee: Hitachi, Ltd., Tokyo, Japan

[21] Appl. No.: 243,069

[22] Filed: Mar. 12, 1981

[30] Foreign Application Priority Data

Mar. 13, 1980 [JP] Japan ................................ 55-32492

[51] Int. Cl.³ .......................... C02F 1/42; G21F 9/12

[52] U.S. Cl. .................................. 210/682; 210/912; 210/919; 252/631

[58] Field of Search .............. 210/682, 804, 919, 805, 210/673, 793, 912; 252/631

[56] References Cited

U.S. PATENT DOCUMENTS

| | | | |
|---|---|---|---|
| 3,520,805 | 7/1970 | Ryan | 210/682 |
| 3,805,959 | 4/1974 | Mertens | 252/631 |
| 3,962,078 | 6/1976 | Hirs | 210/682 |
| 4,033,868 | 7/1977 | Meichsner et al. | 210/682 |

FOREIGN PATENT DOCUMENTS 53-137400 11/1978 Japan .

*Primary Examiner*—Peter A. Hruskoci
*Attorney, Agent, or Firm*—Antonelli, Terry & Wands

[57] ABSTRACT

Backwash water containing radioactive cruds of a non-filter aid type filter of the primary cooling water system of an atomic power plant is treated by leading the backwash water directly, or supernatant obtained by removing coarse cruds by settling in advance, to a waste resin settling tank for backwash water containing waste ion exchange resin powder from filter-demineralizer of the condensation-purification system of the atomic power plant, mixing the backwash water or the supernatant with the backwash water from the filter-demineralizer in the tank, thereby allowing the cruds contained in the backwash water or the supernatant onto the waste ion exchange resin powder, and settling the crud-adsorbed waste ion exchange resin powder, thereby separating and removing the cruds from the backwash water from the non-filter aid type filter. Recycle of fine cruds can be eliminated with enhanced percent crud removal, and recycle time of backwash water can be shortened. Load on a concentrator can be reduced with reduced number of drums filled with radioactive waste.

7 Claims, 5 Drawing Figures

PROCESS FOR TREATING LIQUID WASTE CONTAINING SOLID FINE PARTICLES

BACKGROUND OF THE INVENTION

The present invention relates to a process for treating a liquid waste containing solid fine particles, and particularly to a process for separating and removing solid fine particles having sizes of 0.1–10 μm, so-called cruds, suspended in the backwash water from non-filter aid type filter used in an apparatus for treating radioactive liquid waste in the primary cooling water system of an atomic power plant.

The radioactive liquid waste discharged from the primary cooling water system of an atomic power station contains insoluble cruds comprised mainly of radioactivated iron oxide fine particles, and thus it is necessary to separate and remove the cruds from the liquid waste by a radioactive liquid waste filter to reuse the liquid waste as primary cooling water.

As the radioactive liquid waste filter, a non-filter aid type filter, for example, a membrane filter, such as nuclear pore membrane filter, a centrifugal filter, such as supercentrifuge, or a porous tubular filter, has been recently used to reduce the amount of secondary waste.

The radioactive liquid waste from the primary cooling water system of an atomic power plant has been so far treated in the following manner.

A liquid waste from the primary cooling water system of an atomic power plant, which contains insoluble cruds, is collected in a liquid waste collection tank, and then filtered through a non-filter aid type filter so that the filtrate can have a crud concentration of the standard value of 0.5 ppm or less, and then the filtrate is demineralized. The dimineralized filtrate is collected into a liquid sample tank, and when the filtrate meets the recovery standard value by sampling, the filtrate is recovered into a recovered water storage tank, and then reused as the primary cooling water for the atomic power plant.

The non-filter aid type filter, which has captured the cruds in the above-mentioned treatments, is controlled to refrain passage of the liquid waste therethrough at specific intervals and is backwashed with water to separate the captured cruds and maintain its performance. The backwash water from the non-filter aid type filter is transferred into a waste resin settling tank for backwash water (comprised mainly of waste ion exchange resin powder) from the filtrate-demineralizer of the nuclear reactor coolant clean-up system in a waste treatment facility (the nuclear reactor coolant clean-up system will be hereinafter referred to as "CUW system"), where the cruds are allowed to settle. The resulting supernatant is recycled to the above-mentioned liquid waste collection tank, where the turbidity of the supernatant to be recycled is set forth to be 20 ppm or less to maintain the performance of the non-filter aid type filter and satisfy the recovery standard value. When it is difficult to suppress the turbidity of supernatant to 20 ppm or less or the radioactivity of supernatant is higher, the supernatant is led to a floor drain collection tank, and then to a floor drain concentrator, where it is concentrated together with floor drain by evaporation. The water vapor thus generated is condensed, then demineralized and recovered into a floor drain sample tank. When the condensate meets the recovery standard value by sampling, the condensate is transferred into the recovered water storage tank, or discharged to the outside of the system. On the other hand, the concentrated liquid waste by the evaporation in the concentrator is stored in a concentrated liquid waste tank for a specific period of time, and then subjected to solidification treatment, and the resulting solid is filled in a drum.

It has been found by the present inventors that the supernatant treatment of the backwash water from the non-filter aid type filter has the following problems. The backwash water from the non-filter aid type filter, which is generated at least once in a day, is to be mixed with the backwash water, comprised mainly of waste ion exchange resin powder, from a filter-demineralizer of CUW system, which is generated only once in a month, in the waste resin settling tank of CUW system. That is, due to such a large difference in frequency of generation therebetween, and thus due to less chance for mixing, thorough adsorption of the cruds by the waste ion exchange resin powder cannot be expected. Consequently, fine cruds (1 μm or less) remain in the supernatant, and are recycled to the liquid waste collection tank and then to the non-filter aid type filter for retreatment. Not only is the load inevitably increased on the capacity of the non-filter, aid type filter but also the clogging speed of filter is accelerated with the recycled fine cruds, thereby resulting in an increased frequency of backwashing, and correspondingly in an increased amount of backwash water.

One of measures for solving these problems is to concentrate the supernatant from the waste resin settling tank of CUW system in a concentrator by evaporation, but this inevitably increases the number of drums filled with the resulting concentrated liquid waste in a high radioactivity level.

Another measure is to use a coagulant to improve the settling ability of cruds, but the coagulant used cannot be completely removed from the supernatant, and thus the use of a coagulant has an adverse effect upon nuclear fuels, etc. when its reuse in the reactor core is taken into account.

SUMMARY OF THE INVENTION

An object of the present invention is to provide a process for readily separating and removing fine cruds in backwash water from a non-filter aid type filter of the primary cooling water system of an atomic power plant, which has been so far regarded as difficult to remove, by mixing the backwash water from the non-filter aid type filter directly, or the supernatant freed from coarse cruds in the backwash water in advance, with the backwash water from the filter-demineralizer in a condensate purification system of the atomic power plant, which is generated in a low radioactivity level with substantially same frequency of generation as that of the backwash water from the non-filter aid type filter of the primary cooling water system and which is comprised mainly of ion exchange resin powder.

That is, the present invention provides a process for treating backwash water from a non-filter aid type filter in the primary cooling water system of an atomic power plant, which comprises introducing backwash water containing suspended radioactive cruds directly, or a supernatant obtained by settling the backwash water in advance to remove coarse cruds, into a waste resin settling tank for backwash water containing waste ion exchange resin powder from the filter-demineralizer of the condensation-purification system of the atomic power plant, mixing the backwash water or the supernatant with the backwash water from the filter-demineralizer of condensation-purification system in the tank, thereby allowing the cruds contained in the backwash water or the supernatant to be adsorbed on the waste ion exchange resin powder contained in the backwash water of the filter-demineralizer of condensation-purification system, and settling the waste ion exchange resin powder, thereby separating and removing the suspended cruds from the backwash water or the supernatent.

The present invention will be described in detail, referring to the accompanying drawings.

BRIEF DESCRIPTION OF THE DRAWINGS

In FIG. 1, a liquid waste 1 from the primary cooling water system of an atomic power plant containing insoluble cruds is collected into a liquid waste collection tank 2, and then led to a non-filter aid type filter 4 through a pump 3. In the filter 4, the liquid waste is filtered so that the filtrate can have the standard value of 0.5 ppm or less, and then the filtrate is demineralized in a waste demineralizer 5. The demineralized filtrate is then led to a liquid waste sample tank 6, and, when the filtrate meets the recovery standard value by sampling, it is recovered into a recovered water storage tank 8 through a pump 7 and then reused as the primary cooling water for the atomic power plant.

Figure 1:
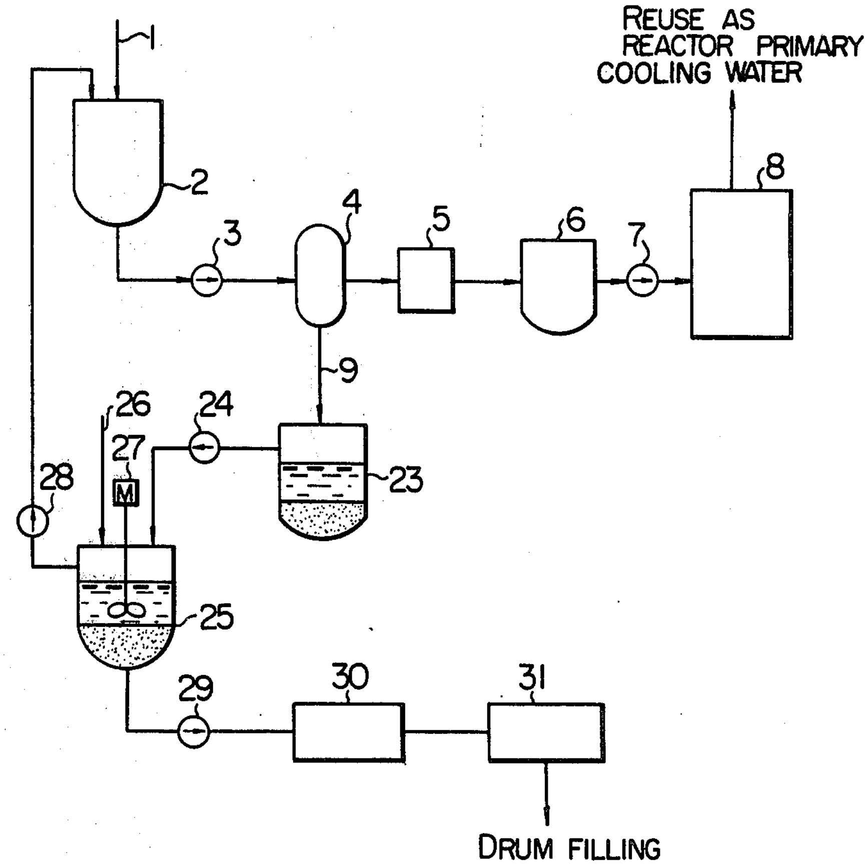
FIG. 1 is a flow diagram showing one embodiment of the process for treating a liquid waste according to the present invention.

According to the embodiment shown in FIG. 1, the backwash water 9 generated from the non-filter aid type filter 4 at least once in a day at room temperature in the form of crud slurry is at first led to a crud settling tank 23, where coarse cruds are separated from the crud slurry by settling. The resulting supernatant is led to a waste resin settling tank 25 for backwash water containing waste ion exchange resin powder from the condensation-purification system of the atomic power plant through a pump 24 from the tank 23 when the turbidity of the supernatant reaches 60 ppm or less by the settling. Besides the supernatant from the tank 23, the backwash wash 26 containing the waste ion exchange resin powder from the condensation-purification system, which is generated at substantially same frequency as that of the backwash water 9, is introduced into the tank 25 through another line. These two kinds of backwash water are gently stirred in the tank 25 by a stirrer 27. The fine cruds suspended in the supernatant from the tank 23 is adsorbed onto the waste ion exchange resin powder (100–200 μm), for example, Pawdex, used as the filter aid and contained in the backwash water of filter-demineralizer of the condensation-purification system, and by stopping the stirrer 27 the resin powder starts to settle down. The resulting supernatant is recycled from the tank 25 to the liquid waste collection tank 2 by a pump 28, when the turbidity of the supernatant reaches 20 ppm or less.

On the other hand, the cruds settled down at the bottom of the settling tank 23 are retained there semipermanently, for example, for 30 years, whereas the waste resin powder containing fine cruds settled down at the bottom of the settling tank 25 is retained for a period enough to decay the radioactivity, and then withdrawn to a dehydrator 30 by a pump 29, then solidified in a solidifier 31 and filled into drums.

Characteristics of the liquid waste treatment according to the present invention will be described below on the basis of actual test results, referring to FIGS. 2-4.

Figure 2:
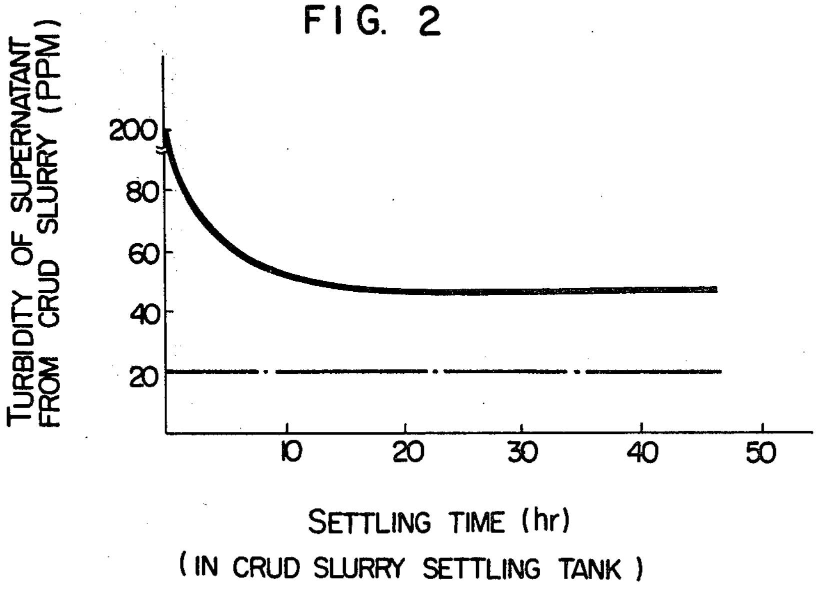
FIGS. 2-4 are characteristic diagrams showing the liquid waste treatment according to the present invention.
Figure 3:
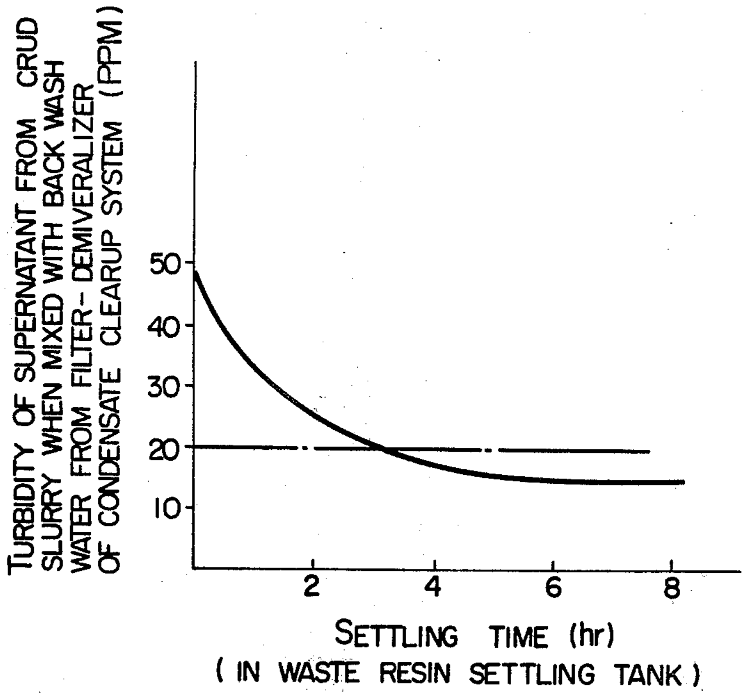

In FIG. 2, the settling characteristics of cruds alone in the settling tank 23 are shown. It is seen therefrom that the initial turbidity 200 ppm of supernatant is lowered to 50 ppm after 15 hours.

The supernatant whose turbidity is lowered to 50 ppm in the settling tank 23 is led to the waste resin settling tank 25, where the supernatant is mixed with the backwash water 26 containing the ion exchange resin powder from filter-demineralizer of condensation-purification system. The settling characteristics of fine cruds in the settling tank 25 are shown in FIG. 3, where it is shown that after the settling for about 4 hours in the settling tank 25 from the end of stirring, the turbidity of the supernatant in the settling tank 25 is lowered to less than 20 ppm, which is the limit value for recycling to the liquid waste collection tank 2.

Figure 4:
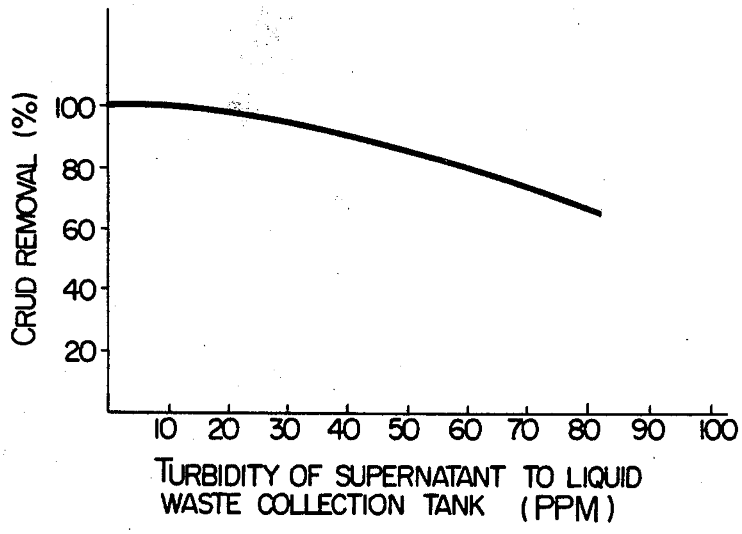

In FIG. 4, the turbidity of the supernatant to be recycled from the settling tank 25 to the liquid waste collection tank 2 is shown in comparison with the percent crud removal. As is evident from FIG. 4, percent crud removal can reach about 98% or higher, if the turbidity of the supernatant to the liquid waste collection tank 2 is kept at 20 ppm or less.

Figure 5:
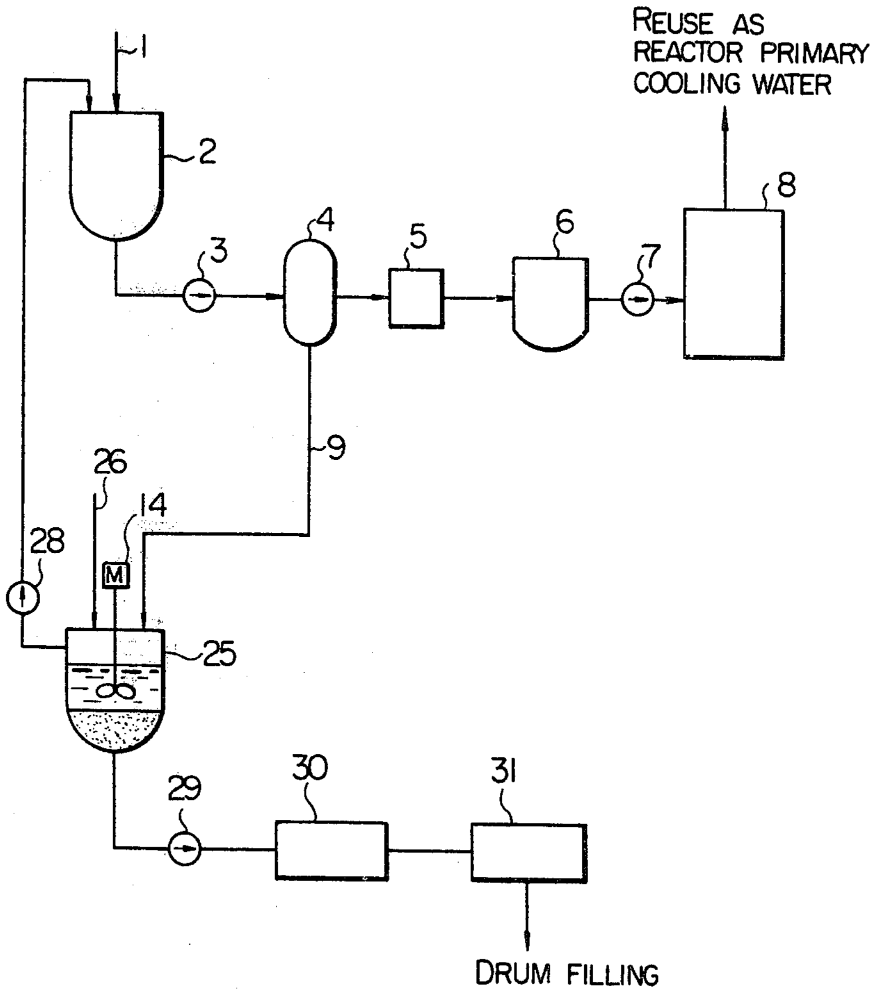
FIG. 5 is a flow diagram showing another embodiment of the process for treating a liquid waste according to the present invention.

In FIG. 5, another embodiment of the present invention is shown, where the embodiment of FIG. 5 is different from that of FIG. 1 only in that the former does not use the crud settling tank 23 of FIG. 1, that is, the backwash water from the non-filter aid type filter is directly to the waste resin settling tank 25. That is, other members than the omitted crud settling tank 23 are the same as in FIG. 1 with the same reference numbers and the same functions as in FIG. 1.

The embodiment of FIG. 5 will be described below on the basis of actual data, where backwash water batchwise generated from a non-filter aid type filter 4 (backwash water volume: 2 $m^3$–10 $m^3$/batch; concentration: 0.2–0.5% by weight/batch) is led to a waste resin settling tank 25 of condensation-purification system, to which backwash water 26 containing waste ion exchange resin powder, batchwise generated from filter-demineralizer of the condensation-purification system (backwash water volume: about 40 $m^3$/batch; sludge concentration: about 0.3% by weight/batch) is led, and mixed with the backwash water 26 by stirring by a stirrer 14 at about 400 rpm for about 10–30 minutes (one batch volume: 42–50 $m^3$, sludge concentration: about 0.3% by weight), and then left standing for 2–4 hours, whereby the cruds in the backwash water from the non-filter aid type filter 4 are adsorbed onto the waste resin powder and settled down together with the waste resin powder in the tank 25. Recycling of supernatant from the tank 25 to a liquid waste collection tank 2 and treatment of the settled sludge in the tank 25 and treatment of the liquid waste 1 over to recovered water in the recovered water storage tank 8 are carried out in the same manner as described above, referring to FIG. 1.

According to the present invention, the following effects can be obtained in the treatment of backwash water from the non-filter aid type filter of the primary cooling water system of an atomic power plant.

(1) Recycle of fine cruds to the non-filter aid type filter can be eliminated, and percent crud removal can be enhanced. Time for the recycle of backwash water to the non-filter aid type filter can be shortened.

(2) Load upon a concentrator can be reduced, and consequently the number of drums filled with radioactive waste can be reduced.

What is claimed is:

1. A process for treating backwash water of a non-filter aid type filter used in filtering radioactive liquid waste discharged from the primary cooling water system of an atomic power plant for reuse, which comprises leading backwash water containing suspended radioactive cruds comprised of radioactivated iron oxide particles from the non-filter aid type filter to a waste resin settling tank for backwash water containing waste ion exchange resin powder from a filter-demineralizer of a condensation-purification system of the atomic power plant, mixing the backwash water from the non-filter aid type filter with an effective amount of the backwash water from the filter-demineralizer in the tank, thereby allowing the cruds contained in the backwash water from the non-filter aid type filter to be adsorbed onto the waste ion exchange resin powder, and settling the crud-absorbed waste ion exchange resin powder, thereby separating and removing the cruds from the backwash water from the non-filter aid type filter and recycling resultant supernatant from the waste resin settling tank to the non-filter aid type filter in the primary cooling system.

2. A process for treating backwash water of a non-filter aid type filter used in filtering radioactive liquid waste discharged from the primary cooling water system of an atomic power plant for reuse, which comprises subjecting backwash water containing suspended radioactive cruds comprised of radioactivated iron oxide particles from the non-filter aid type filter to a preliminary settling separation in advance, thereby removing coarse cruds from the backwash water, leading the resulting supernatant freed of the coarse to a waste resin settling tank for backwash water containing waste ion exchange resin powder from a filter-demineralizer of a condensation-purification system of the atomic power plant, mixing the resulting supernatant with an effective amount of the backwash water from the filter-demineralizer in the tank, thereby allowing the remaining cruds contained in the supernatant to be adsorbed onto the waste ion exchange resin powder, settling the crud-adsorbed waste ion exchange resin powder, thereby separating and removing the remaining cruds from the backwash water from the non-filter aid type filter and recycling the resultant supernatant from the waste resin settling tank to the non-filter aid type filter in the primary cooling system.

3. A process according to claim 2, wherein the supernatant free of the coarse cruds has a turbidity of 60 ppm or less.

4. A process according to claim 1, or 2, wherein the waste ion exchange resin powder in the backwater water from the filter-demineralizer has grain sizes of 100–200 μm and a concentration of 0.31% by weight.

5. A process according to claim 1 or 2, wherein the resultant supernatant from the waste resin settling tank freed of fine cruds has a turbidity of 20 ppm or less.

6. A process according to claim 1 or claim 2, wherein said waste resin settling tank receives said backwash water containing waste ion exchange resin powder at the same frequency as the frequency of receipt of the backwash water containing the suspended radioactive cruds.

7. A process according to claim 1 or claim 2, wherein the backwash water from the filter and the backwash water from the filter-demineralizer are mixed with agitation in said tank for a period on the order of from 10 to 30 minutes and then the resulting crud-adsorbed waste ion exchange resin powder is allowed to settle for a period on the order of from 2 to 4 hours before the resultant supernatant is recycled to the filter.

* * * * *